United States Patent [19]
Oda et al.

[11] Patent Number: 4,990,302
[45] Date of Patent: Feb. 5, 1991

[54] APPARATUS FOR MEASURING NUCLEAR REACTOR POWER DISTRIBUTION

[75] Inventors: Minoru Oda; Kunio Ooba; Hirotsugu Fujiwara, all of Hyogo, Japan

[73] Assignee: Mitsubishi Denki Kabushiki Kaisha, Tokyo, Japan

[21] Appl. No.: 265,944

[22] Filed: Nov. 2, 1988

[30] Foreign Application Priority Data

Dec. 25, 1987 [JP] Japan .................................. 62-327239

[51] Int. Cl.$^5$ ............................................... G21C 7/36
[52] U.S. Cl. ...................................... 376/216; 376/254; 364/553
[58] Field of Search ............... 376/215, 216, 254, 255; 364/550, 553, 726

[56]  References Cited
U.S. PATENT DOCUMENTS

| 4,069,097 | 1/1978 | Frank | 376/254 |
| 4,075,059 | 2/1978 | Bruno | 376/216 |
| 4,079,236 | 3/1978 | Graham et al. | 364/504 |
| 4,774,050 | 9/1988 | Impink | 376/245 |

FOREIGN PATENT DOCUMENTS 3701457  7/1987  Fed. Rep. of Germany .

OTHER PUBLICATIONS

Atomnaja Energya, "Use of Detectors Installed Outside of the Nuclear Reactor to Determine the Reactor Power and the Mean Power Distribution in the Axial Direction of the Core", vol. 57, No. 1, Jul. 1984, pp. 18–21.

Primary Examiner—Donald P. Walsh
Attorney, Agent, or Firm—Bernard, Rothwell & Brown

[57] ABSTRACT

An apparatus for measuring nuclear reactor power distribution comprises a Fourier coefficient calculation means and a transformation means, whereby Fourier coefficients of neutron detector outputs are transformed into Fourier coefficients of integrated values of the reactor power on each interval, and hence conditions required of data for initial calibration are made less severe and the initial calibration is enabled to be performed much easier. The apparatus further comprises an abnormal data deletion means, whereby detection and deletion of abnormal data are made easy so that the apparatus performs a stable operation with high accuracy.

6 Claims, 5 Drawing Sheets

POWER DISTRIBUTION ALONG
REACTOR CORE AXIS
P (Z)

OUTPUTS OF SMALL SIZE
DETECTORS
Dk

APPARATUS FOR MEASURING NUCLEAR REACTOR POWER DISTRIBUTION

BACKGROUND OF THE INVENTION

1. Field of the Invention

The present invention relates to an apparatus for measuring power distribution in the core of a nuclear reactor.

2. Description of the Prior Art

To know power distribution in the core of a nuclear reactor is a matter of importance in the operation of the nuclear reactor. There have so far been proposed some types of apparatuses for measuring the power distribution. A first type of the measuring apparatus is of such an arrangement that a large number of stationary small neutron detectors are disposed within the nuclear reactor. In this first type of measuring apparatus, it is essential that the large number of neutron detectors will stably operate for a long period of time. It, however, is very difficult to manufacture such reliable and stable neutron detectors.

A second type is of such an arrangement that a large number of holes for insertion of a small neutron detector are made in the nuclear reactor and a small neutron detector is inserted into these holes one after another so that it scan and measure the power distribution in the core. In the case of this second type of measuring apparatus, such problems are encountered that a long time is taken for measuring the output distribution in the nuclear reactor in its entirety and, when the power distribution in the core changes abruptly, the apparatus is unable to follow the abrupt changes.

As a third type of the measuring apparatus, there is one as disclosed in Japanese Laid-open Patent Publication No. 52-107496. The apparatus of this type uses a number of small size detectors provided by cutting a detector of an out-of-core neutron measuring apparatus, which has been conventionally in use for measuring output power of a pressurized water reactor, across its axis into segments and is adapted to obtain the power distribution in the core along its axis through calculation of output signals of the small size detectors.

The principle of the third type measuring apparatus will be described with reference to the drawings hereunder. FIG. 1 is a schematic arrangement diagram showing arrangement of a nuclear reactor and a neutron detector. Referring to the figure, 10 denotes a reactor core and 20 denotes a neutron detector, which is formed of small size detectors 21-24 provided by cutting the neutron detector 20 across its axis (into four segments in the present case).

FIG. 2 shows relationship between reactor power axial distribution P(Z) and the output signals $D_k$ of the small size detectors 21-24 shown in FIG. 1. Since each of the small size detectors 21-24 is affected most strongly by the power of the portion of the core 10 of the nuclear reactor closest thereto, the pattern formed by the magnitude of each of the output signals $D_k$ of the small size detectors 21-24 becomes similar to the reactor power axial distribution P(Z).

FIG. 3 is a diagram for explaining the method for obtaining, by calculation, the reactor power axial distribution P(Z) from the output signals $D_k$ of each of the divided small size detectors 21-24. Here is taken the point of view that the reactor power axial distribution P(Z) is approximated by Fourier series as $$P(Z) \approx \sum_{i=1}^{4} C_i \sin\left(i\pi \frac{Z}{H}\right) \quad (1)$$

where H: the maximum height in the core.

If $C_i$ in the expression (1) can be obtained from the output signals $D_k$ of the small size detectors 21-24, then the power distribution in the core can be obtained from the output signals of the out-of-core neutron detector 20 within the accuracy of the approximation of the expression (1).

By dividing the height of the core into the same number as that of the small size detectors 21-24 and integrating (1) on each interval, the integrated value $P_j$ on the jth interval from the bottom will be expressed as $$P_j = \int_{B_j}^{T_j} P(Z)dZ = \int_{B_j}^{T_j} \sum_{i=1}^{4} C_i \sin\left(i\pi \frac{Z}{H}\right) dZ = \sum_{i=1}^{4} C_i \left\{\cos\left(i\pi \frac{B_j}{H}\right) - \cos\left(i\pi \frac{T_j}{H}\right)\right\} \quad (2)$$

where $B_j$: the lower limit of the jth interval from the bottom,
$T_j$: the upper limit of the jth interval from the bottom.

By defining $$Q_{ji} = \cos\left(i\pi \frac{B_j}{H}\right) - \cos\left(i\pi \frac{T_j}{H}\right) \quad (3)$$

the integrated values $P_j$ of the reactor power on each interval will be expressed by use of the matrix $[Q_{ji}]$ as $$[P_j] = [Q_{ji}][C_i] \quad (4)$$

hence $$[C_i] = [Q_{ji}]^{-1}[P_j] \quad (4)'$$

If the relationship between the output signals $D_k$ of each of the small size detectors 21-24 and the integrated values $P_j$ of the reactor power on each interval can be determined, $C_i$ can be determined from the output signals $D_k$ of each of the small size detectors 21-24, and hence the approximate value of the reactor power distribution P(Z) will be obtained from the expression (1).

Further, it is considered that the output signals $D_k$ can be expressed as a linear combination of the power output from each of the sections of the core and the transformation matrix therefor is virtually invariable for a specific nuclear reactor. Hence, letting $[A_{kj}]$ be a constant matrix, we obtain $$[D_k] = [A_{kj}][P_j] \quad (5)$$

hence $$[P_j] = [A_{kj}]^{-1}[D_k] \quad (5)'$$

Since, the transformation matrix $[A_{kj}]^-$ is dependent on the structure of the nuclear reactor, it must be obtained from actual measurement data of the nuclear reactor.

In other words, it is required that a number of sets of data of the integrated values $P_j$ of the reactor power on each interval and the detector outputs $D_k$ are obtained through simultaneous measurement on the nuclear reactor to which the present method is desired to be applied. The integrated values $P_j$ of the reactor power on each interval can be obtained by integrating, on each interval, the reactor power axial distribution $P(Z)$ obtained from the incore neutron instrumentation.

The transformation matrix $[A_{kj}]^{-1}$ is obtained by solving simultaneous equations provided by these data. The obtaining of the transformation matrix $[A_{kj}]^{-1}$ constitutes initial calibration on S/W in the present method. Once the transformation matrix $[A_{kj}]^{-1}$ is determined, the reactor power axial distribution $P(Z)$ can be obtained from the output signals $D_k$ of the small size detectors 21-24 within the limit of the accuracy of the approximation of the expression (1).

Here, the sets of data used in the present method, namely, the integrated values $P_j$ of the reactor power on each interval and the detector outputs $D_k$ must be such that correspond to various power distribution and also the number of sets of the data must at least be equal to the number of division of the neutron detector 20 (four in the present case) or above.

Since the prior art apparatus for measuring the nuclear reactor power distribution has been structured as described above, it is really difficult to obtain the data for finding the transformation matrix $[A_{kj}]^{-1}$ at the stage of the initial calibration. The data satisfying the aforementioned conditions are normally obtained only from the plant at the stage before commencement of commercial operation when various tests are carried out. Unless the used data fully satisfy these conditions, it becomes very difficult to obtain the transformation matrix $[A_{kj}]^{-1}$ and the accuracy of the obtained transformation matrix $[A_{kj}]^{-1}$ becomes very low. The prior art apparatus have had these problems.

SUMMARY OF THE INVENTION

An object of the present invention is to provide an apparatus for measuring nuclear reactor power distribution which will relax the conditions required of the data for initial calibration, so that the initial calibration can be performed with less difficulty even if the data do not fully satisfy the conditions and will therefore be readily applied to a existing plant.

Another object of the present invention is to provide an apparatus for measuring nuclear reactor power distribution which will enable abnormal data to be easily detected and deleted prior to the initial calibration and therefore will stably operate with high accuracy.

In order to achieve the object mentioned first above, the apparatus for measuring nuclear reactor power distribution according to the present invention is adapted such that Fourier coefficients are calculated by a Fourier coefficient calculation means from each of outputs of a neutron detector and integrated values of reactor power on each interval of the core divided into virtually the same height as that of the small size detectors, respectively, and Fourier coefficients of the outputs of the neutron detector are transformed into Fourier coefficients of integrated values of the reactor power on each interval by a Fourier coefficient transformation means, whereby data for the initial calibration is obtained.

In order to achieve another object mentioned above, the apparatus for measuring nuclear reactor power distribution according to the present invention is adapted such that, after the Fourier coefficients of the neutron detector outputs and Fourier coefficients of integrated values of the reactor power on each interval have been calculated by the Fourier coefficient calculation means, abnormal data are detected and deleted by an abnormal data deletion means by use of correlation between both the Fourier coefficients, and then Fourier coefficients of the outputs of the neutron detector are transformed into Fourier coefficients of integrated values of the reactor power on each interval, whereby data for the initial calibration is obtained.

DETAILED DESCRIPTION OF THE PREFERRED EMBODIMENTS

Figure 1:
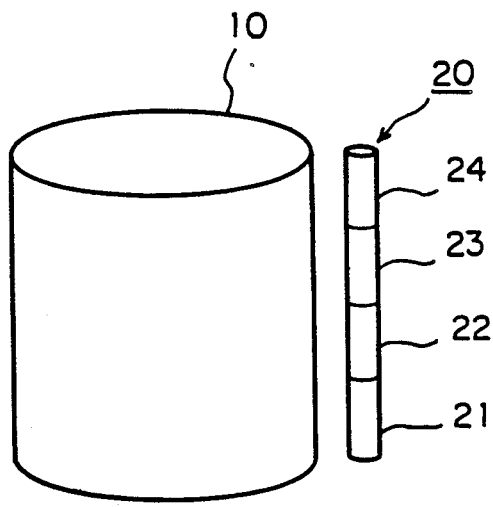
FIG. 1 is a schematic diagram showing arrangement of a nuclear reactor and a detector.
Figure 2:
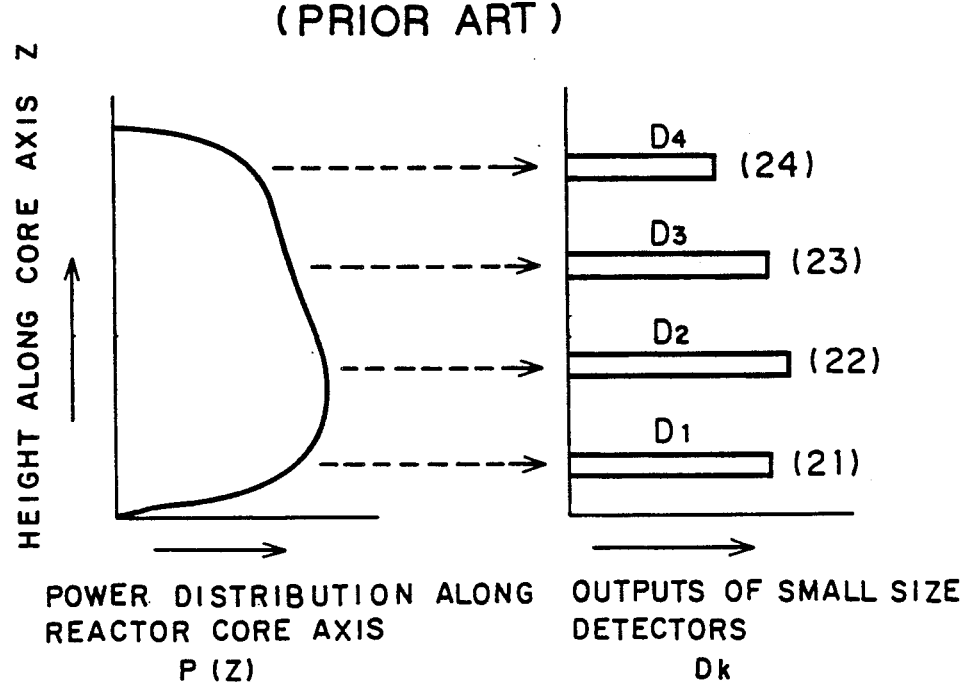
FIG. 2 is a diagram showing relationship between reactor power distribution and output signals of neutron detectors.

A preferred embodiment of the present invention will be described below in detail referring to the accompanying drawings.

First, principle and function of the present invention will be described with reference to FIG. 4. Integrated values $P_j$ on each interval of the reactor power distribution $P(Z)$ and detector outputs $D_k$ are normalized so that their summation may each become unity (step ST1, ST2) and thereby these values are represented as $NP_j$, $ND_k$, respectively. Then, $NP_j$ and $ND_k$ are each applied with Fourier coefficient calculation matrix $[Q]^{-1}$ as in the expression (4)' by using a Fourier coefficient calculation means (step ST3, ST4), and the results are represented respectively as Fourier coefficients $CP_i$ of the integrated values of the reactor power on each interval and Fourier coefficients $CD_i$ of the neutron detector outputs. Hence $$[CP_i] = [Q_{ji}]^{-1}[NP_j] \qquad (6)$$

$$[CD_i] = [Q_{ki}]^{-1}[ND_k] \qquad (7)$$

Fourier coefficients $CP_i$ of integrated values of the reactor power on each interval is then obtained from the Fourier coefficients $CD_i$ of the neutron detector outputs using a transformation means. Prior to that, however, characteristics of the Fourier coefficients $CD_i$ will be described. First, the detector outputs $D_k$ is a representative of the neutron flux distribution that has reached the position of the detector deriving itself from the reactor power distribution $P(Z)$ and undergoing diffusion and scattering of neutrons, and hence $CD_i$ have the high frequency component (those terms whose i are larger) attenuated more than $CP_i$. This means that the diffusion and scattering of neutrons has an action of a low-pass filter. From this point of view, the law of mutual transformation between $CD_i$ and $CP_i$ is considered to be expressed, using a diagonal matrix $[A_{ii}]$ to be determined at step ST5, as $$[CP_i] = [A_{ii}][CD_i] \quad (8)$$

That the diagonal matrix $[A_{ii}]$ needs not have other elements than the diagonal elements is assured of by the fact that the diffusion or scattering of the neutrons is a linear physical process. In view of the geometrically larger scale, however the diffusion of the neutrons will be such that spreads in the form of spherical wave with the nuclear reactor taken as the center. Hence the pattern of power distribution may have expanded to a certain degree at the position of the neutron detector 20 located on the outside of the reactor. This phenomenon, however, merely means a difference in scale factor and does not mean any interference between different frequency components. Therefore, there is no problem in the use of the expression (8).

A second characteristic of the Fourier coefficients $CD_i$ originates from the fact that the detector outputs $D_k$ is flatter than the integrated values $P_j$ of the reactor power on each interval because the former has derived itself from the latter undergoing diffusion and scattering of neutrons and that the domain of variable of Z in the expression (1) is a half period of the lowest frequency component ($i=1$). That is, the detector outputs $D_k$, as compared with the integrated values $P_j$ of the reactor power on each interval, is smaller at the central portion ($k=2, 3$) and larger at both end portions ($k=1, 4$), and hence, in the Fourier coefficients obtained from the detector outputs $D_k$, there is produced additionally a component of the third order which was not present originally in the integrated values $P_j$ of the reactor power on each interval. Because of this fact, the transformation rule between $CD_i$ and $CP_i$ cannot be treated simply as a frequency filter. Even if there is such an additional frequency component, it can be expected that the relationship between $CD_i$ and $CP_i$ is expressed by a transformation rule of a linear expression. Namely, it is considered possible to avoid the difficulty resulting from the addition of the third order component nonexistent in the integrated values $P_i$ by using, instead of the expression (8), the following expression with a compensation vector $[Bi]$ introduced into the expression (8)

$$[CP_i] = [A_{ii}][CD_i] + [B_i] \quad (9)$$

When the detector outputs $D_k$ have been normalized in advance, a constant vector will serve as the compensation vector $[B_i]$ (step ST5). When the detector outputs $D_k$ have not been normalized, the following expression may be used instead of the expression (9).

$$[CP_i] = [A_{ii}][CD_i] + (\Sigma_k CD_k)[B_i] \quad (9)$$

As the other characteristic of the Fourier coefficient $CD_i$, there is considered possibility of addition or subtraction of an apparent high-frequency component, which is not included in the original data, besides the aforementioned third order component, because of nonuniformity in sensitivities of the small size detectors 21–24, or nonuniformity of shielding effects of the structures between the nuclear reactor 10 and the neutron detector 20. The transformation rule of the expression (9) is considered to hold good even where there is such a phenomenon (step ST6).

Figure 3:
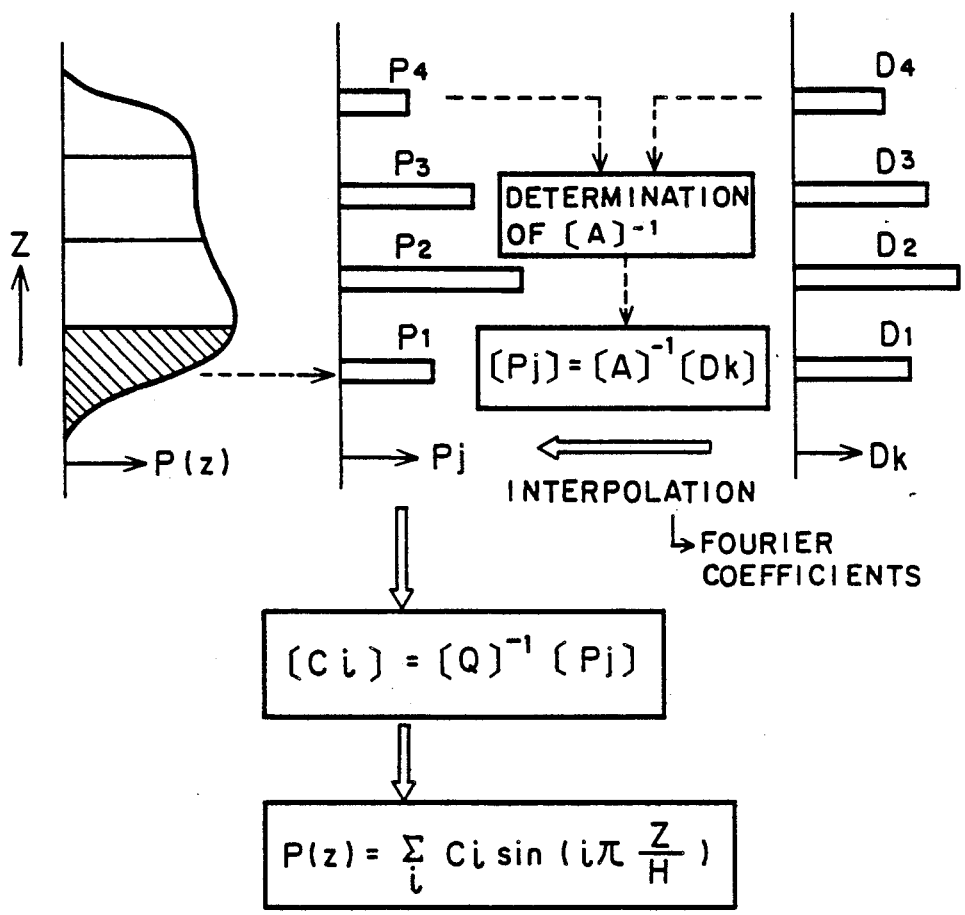
FIG. 3 is a principle diagram of a prior art calculation process.

To prove validity of the above consideration, investigations were made using actually measured data on a nuclear reactor. As the result, the validity was proved in the following way. From many sets of data of integrated values $P_j$ of the reactor power on each interval and detector outputs $D_k$ obtained through actual measurement performed on the nuclear reactor, many sets of $CP_i$ and $CD_i$ were obtained, and these were plotted with $CD_i$ taken along the axis of abscissa and $CP_i$ along the axis of ordinate. As the result, the plotted points were arranged in separate straight lines for each frequency component, whereby the linear transformation rule according to the linear expression (9) was proved to hold good. The actually measured reactor power distribution $P(Z)$ was inclusive of a variety of power distribution at the stage of test operations, and hence, the transformation rule according to the expression (9) indicates that the same transformation rule is applicable to a wide variety of power distribution. Further it was found out that the plotting is effective for checking abnormal data before determining the transformation rule. Any data being abnormal or with error are plotted apart from the above mentioned straight lines and therefore are easily detected and deleted. This was unattainable by the prior art as shown in FIG. 3.

$[A_{ii}]$ and $[B_i]$ in the expression (9) can be obtained from a large number of sets of the integrated values $P_j$ of the reactor power and detector outputs $D_k$ that are measured simultaneously by the method of least squares or the like (step ST5). This is the initial calibration on S/W in the present method. The calculation is much easier than that performed for obtaining the transformation matrix $[A_{kj}]^{-1}$ in the expression (5)' in the prior art. In the case where the coefficients in the constant matrix $[A_{kj}]$ of the expression (5) gently vary and the diagonal elements are slightly dominant, the calculation to obtain the inverse matrix is sensitive and susceptible to errors in the data, which is a well-known general mathematical character in such cases. What should be noted here is that just two is the required number in the minimum of sets of the data of the integrated values $P_j$ of the reactor power and detector outputs $D_k$ necessary for determining $[A_{ii}]$, $[B_i]$ in the expression (9). This is due to the fact that the expression (9) is a linear expression. By virtue of this feature, the conditions required of the data used for initial calibration can be greatly relaxed as against those in the prior art. After the expression (9) has been determined in the initial calibration, the reactor power distribution $P(Z)$ will be obtained by use of the expression (4)' and the expression (1) the same as in the prior art. However, for the reason that the detector outputs $D_k$ in the present embodiment have been normalized according to expressions (6), (7), the reactor power distribution $P(Z)$ obtained here is a relative power distribution $Prel(Z)$ (step ST7). Hence, in order to obtain absolute power distribution $Pabs(z)$, the relative power distribution $Prel(Z)$ may be multiplied by a total power signal $Ptotal$ (%) or by a coefficient obtained from the sum of the detector outputs $D_k$ divided by the sem of the detector outputs $D_k$ at the time of 100% output power (step ST8).

Figure 4:
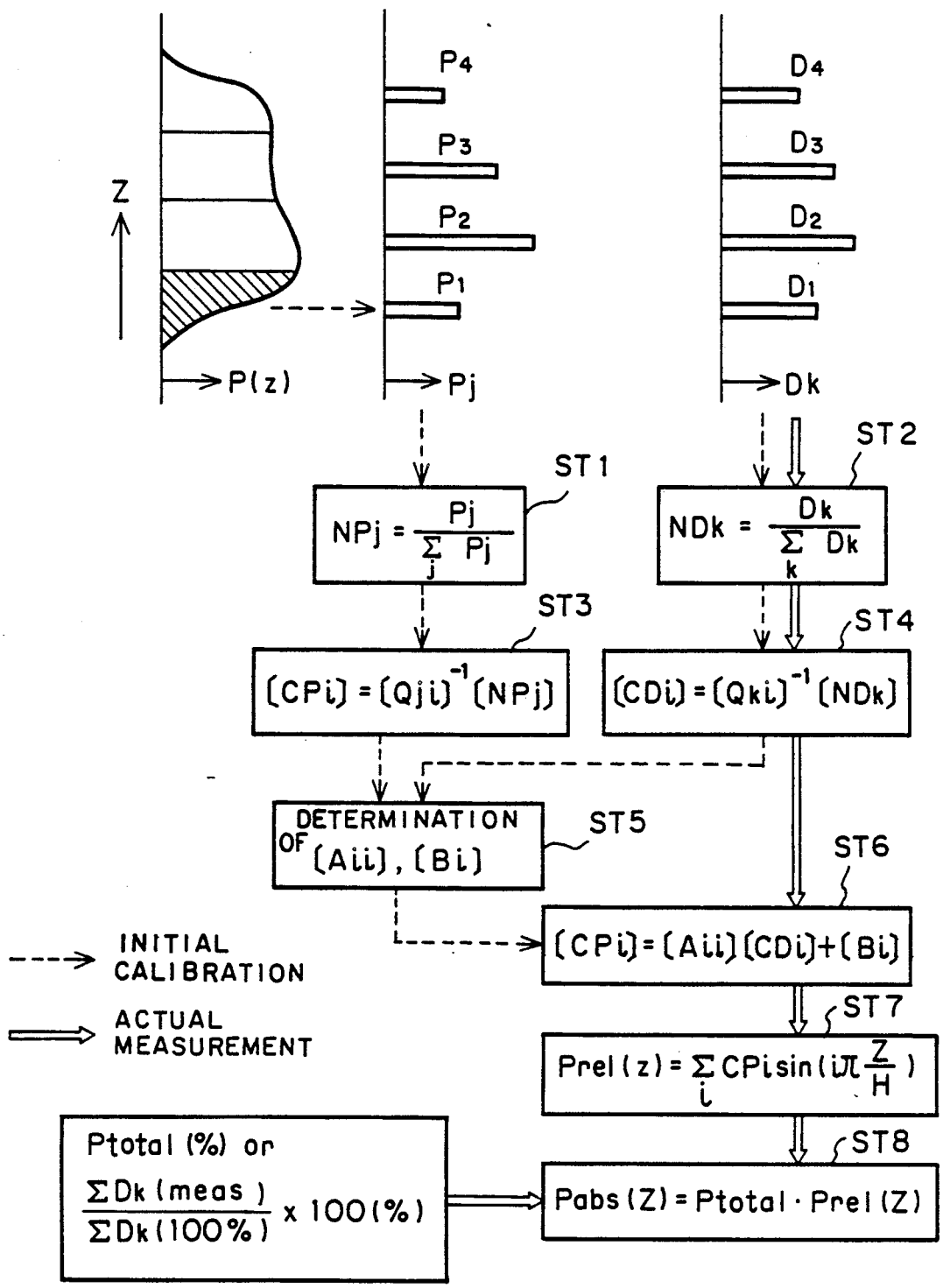
FIG. 4 is a principle diagram of calculation process of an apparatus for measuring nuclear reactor power distribution according to an embodiment of the present invention.
Figure 5:
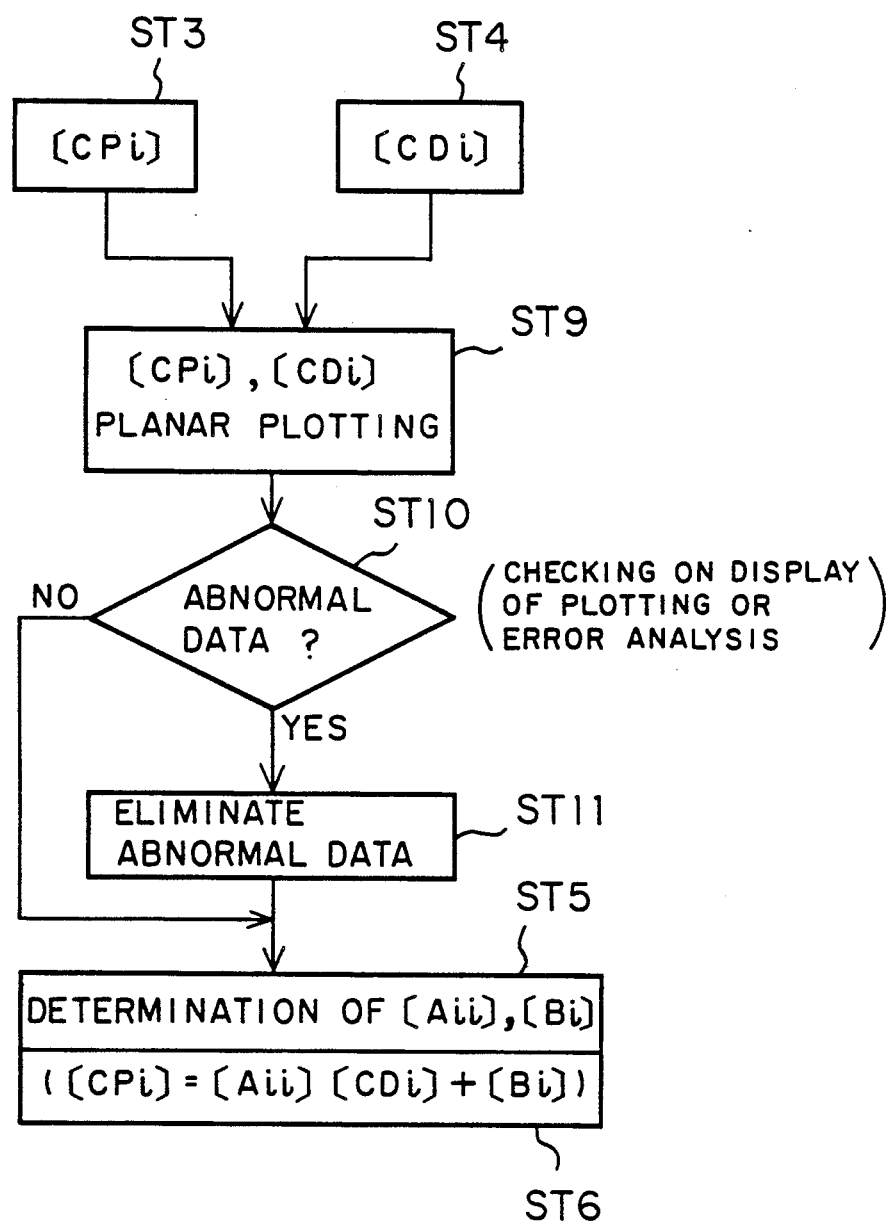
FIG. 5 is a flow chart showing an additional calculation process of an apparatus for measuring nuclear reactor power distribution according to another embodiment of the present invention.
Figure 6:
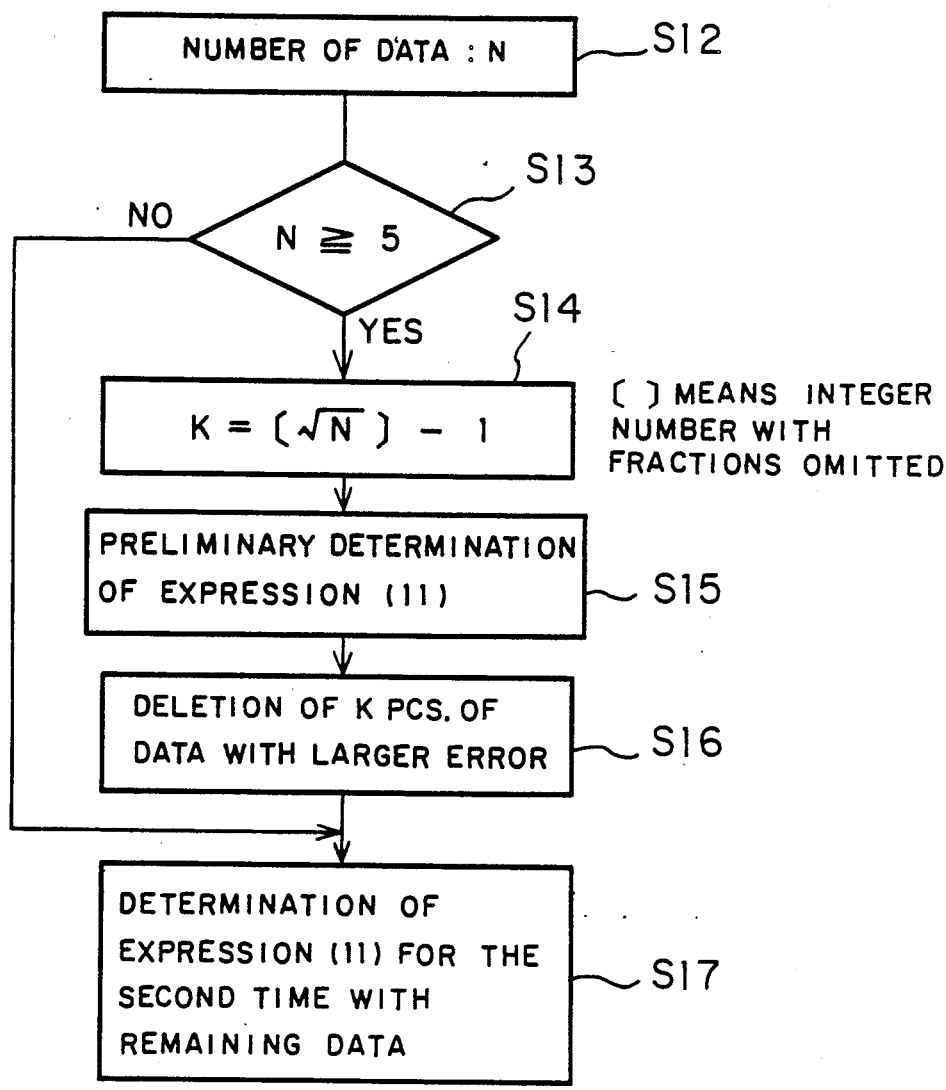
FIG. 6 is a flow chart showing a function to detect and delete abnormal data performed in FIG. 5.

Another embodiment shown in FIG. 5 is what is formed of the function of FIG. 4 and in abnormal data deleting means added thereto. This additional function is performed prior to the initial calibration (step ST5: determination of $[A_{ii}]$, $[B_i]$) in the embodiment of FIG. 4. That is, after executing calculation of the expressions (6), (7) at steps ST3, ST4 as described above, $[CP_i]$,

[CD$_i$] are plotted on a plane at step ST9 and thereafter abnormal data are detected at step ST10. The abnormal data are deleted at step ST11 prior to determination of [A$_{ii}$], [B$_i$] in the expression (9), whereby initial calibration can be performed smoothly and accurately. The abnormal data may be deleted by human visual inspection of a display of the planar plotting or may be automatically deleted by an algorithm set up, for example, as shown in FIG. 6. That is, step ST12 is that for counting number of data, step ST13 is that for deciding whether or not the number of data is larger than 5 i.e. data is sufficient for partial deletion or not, step ST14 is that for processing $K=[\sqrt{N}]-1$ i.e. determining degree of deletion, step ST15 is that for preliminary determining [A$_{ii}$], [B$_i$], step ST16 is that for deleting K pieces of errornious data from one of the largest error, and step ST17 is that for determining [A$_{ii}$], [B$_i$] again from the remaining data.

As described so far, according to the first invention, an apparatus for measuring nuclear reactor power distribution is structured of a Fourier coefficient calculation means and a transformation means so that data for initial calibration are obtained. Hence, it is made possible to greatly relax the conditions required of the data for initial calibration such as necessary number of the data and variety of the data. Thus, the initial calibration is made very easily, and therefore, such an effect is obtained that the apparatus can be applied not only to a plant at the stage before commencement of commercial operation but also to an existing nuclear reactor. And, according to the second invention, abnormal data can be easily detected and deleted prior to initial calibration, and therefore, such an effect is obtained that stable operation of the apparatus with high accuracy can be attained.

What is claimed is:

1. An apparatus for measuring nuclear reactor power distribution including a neutron detector of virtually the same length as the height of a core of a nuclear reactor installed on the outside of the nuclear reactor and adapted such that the reactor power distribution in the axial direction is calculated from detected outputs of small size detectors provided by cutting said neutron detector across its axis into segments, said apparatus for measuring nuclear reactor power distribution comprising:

Fourier coefficient calculation means for calculating, during the course of calibration, a first set of Fourier coefficients from the outputs of said neutron detectors and a second set of Fourier coefficients from the integrated values of the measured reactor power for each height interval of the core divided into virtually the same height intervals as those of said small size detectors; and transformation means utilizing said first and said sets of Fourier coefficients for deriving a transformation operator for transforming said first set of Fourier coefficients of the outputs of said neutron detectors into said second set of Fourier coefficients of the integrated values of the measured reactor power for each height interval, whereby data for calibration is obtained.

2. An apparatus for measuring nuclear reactor power distribution including a neutron detector of virtually the same length as the height of a core of a nuclear reactor installed on the outside of the nuclear reactor and adapted such that the reactor power distribution in the axial direction is calculated from detected outputs of small size detectors provided by cutting said neutron detector across its axis into segments, said apparatus for measuring nuclear reactor power distribution comprising:

Fourier coefficient calculation means for calculating, during the course of calibration, a first set of Fourier coefficients from the outputs of said neutron detectors and a second set of Fourier coefficients from the integrated values of the measured reactor power for each height interval of the core divided into virtually the same height intervals as those of said small size detectors;

abnormal data deletion means for detecting and deleting abnormal data, after said first set of Fourier coefficients of said neutron detector outputs and said second set of Fourier coefficients of integrated values of the reactor power on each interval have been calculated by said Fourier coefficient calculation means, by use of correlation between both sets of Fourier coefficients; and transformation means utilizing said first and second sets of Fourier coefficients for deriving a transformation operator for transforming, after the abnormal data are deleted by said abnormal data deletion means said first set of Fourier coefficients of the outputs of said neutron detector into said second set of Fourier coefficients of the integrated values of the measured reactor power for each height interval, whereby data for calibration is obtained.

3. An apparatus for measuring nuclear reactor power distribution according to claim 2, wherein the deletion of abnormal data is performed manually by the use of a display of a planar plotting.

4. An apparatus for measuring nuclear reactor power distribution according to claim 2, wherein the deletion of abnormal data is performed automatically through algorithm established to include the steps of:
   counting number of data;
   deciding whether or not the number of data is larger than 5;
   processing $K=[\sqrt{N}]-1$;
   preliminarily determining said transformation operator, [A$_{ii}$], [B$_i$];
   eliminating K pieces of erroneous data from those of larger error; and
   determining [A$_{ii}$], [B$_i$] for the second time with remaining data.

5. An apparatus for measuring nuclear reactor power distribution according to claim 1, wherein said transformation means performs the transformation according to $$[CP_i]=[A_{ii}][CD_i]+[B_i]$$

where
   [A$_{ii}$]: constant coefficient diagonal matrix
   [B$_i$]: constant coefficient vector
   [CP$_i$]: Fourier coefficients of integrated values of the reactor power for each interval
   [CD$_i$]: Fourier coefficients of neutron detector outputs 6. An apparatus for measuring nuclear reactor power distribution according to claim 2, wherein said transformation means performs the transformation according to said derived transformation operator as defined by:

$$[CP_i]=[A_{ii}][CD_i]+[B_i]$$

wherein
   [A$_{ii}$]: constant coefficient diagonal matrix
   [B$_i$]: constant coefficient vector
   [CP$_i$]: Fourier coefficients of integrated values of the reactor power for each height interval
   [CD$_i$]: Fourier coefficients of neutron detector outputs.

* * * * *

UNITED STATES PATENT AND TRADEMARK OFFICE
CERTIFICATE OF CORRECTION

PATENT NO. : 4,990,302

DATED : February 5, 1991

INVENTOR(S) : Minoru Oda et al.

It is certified that error appears in the above-identified patent and that said Letters Patent is hereby corrected as shown below:

Column 2, line 64, "$[A_{kj}]^-$" should be --$[A_{kj}]^{-1}$--.

Column 3, line 45, "a" should be --an--.

Column 5, line 46, "$[Bi]$" should be --$[B_i]$--.

Column 6, line 63, "in" should be --an--.

Signed and Sealed this

Eighteenth Day of August, 1992

*Attest:*

DOUGLAS B. COMER

*Attesting Officer*     *Acting Commissioner of Patents and Trademarks*